United States Patent
Mielenz

(10) Patent No.: US 11,592,814 B2
(45) Date of Patent: Feb. 28, 2023

(54) METHOD FOR PROVIDING AN ASSISTANCE SIGNAL AND/OR A CONTROL SIGNAL FOR AN AT LEAST PARTIALLY AUTOMATED VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 17/035,942

(22) Filed: Sep. 29, 2020

(65) Prior Publication Data
US 2021/0096558 A1    Apr. 1, 2021

(30) Foreign Application Priority Data
Sep. 30, 2019   (DE) ............... 10 2019 214 999.5

(51) Int. Cl.
| | | |
|---|---|---|
| G05D 1/00 | (2006.01) | |
| G05D 1/02 | (2020.01) | |
| G07C 5/08 | (2006.01) | |

(52) U.S. Cl.
CPC ......... G05D 1/005 (2013.01); G05D 1/0061 (2013.01); G05D 1/0246 (2013.01); G05D 1/0255 (2013.01); G07C 5/0808 (2013.01)

(58) Field of Classification Search
CPC .... G05D 1/005; G05D 1/0061; G05D 1/0246; G05D 1/0255; G07C 5/0808
See application file for complete search history.

(56) References Cited

U.S. PATENT DOCUMENTS

| | | | | |
|---|---|---|---|---|
| 8,676,427 | B1* | 3/2014 | Ferguson | B60W 10/20 |
| | | | | 701/23 |
| 2002/0113876 | A1* | 8/2002 | Kim | B60R 25/1004 |
| | | | | 348/E7.086 |
| 2017/0106876 | A1* | 4/2017 | Gordon | B60W 30/182 |
| 2017/0190331 | A1* | 7/2017 | Gupta | B60W 30/18163 |
| 2017/0213459 | A1* | 7/2017 | Ogaz | G08G 1/166 |
| 2018/0003515 | A1* | 1/2018 | Saru | G01C 21/3461 |
| 2018/0204437 | A1* | 7/2018 | Singh | G06V 40/25 |
| 2018/0237033 | A1* | 8/2018 | Hakeem | B60R 11/0247 |
| 2018/0239352 | A1* | 8/2018 | Wang | B60W 30/182 |
| 2019/0220248 | A1* | 7/2019 | Cordourier Maruri | G06N 3/02 |
| 2019/0291639 | A1* | 9/2019 | Hanson | G08G 1/0962 |
| 2019/0383624 | A1* | 12/2019 | Magzimof | H04B 17/373 |
| 2020/0031337 | A1* | 1/2020 | Soltanian | B60W 30/0956 |

(Continued)

FOREIGN PATENT DOCUMENTS

| | | |
|---|---|---|
| DE | 10 2005 006 528 A1 | 8/2006 |
| DE | 10 2013 201 168 A1 | 7/2014 |

(Continued)

*Primary Examiner* — Hunter B Lonsberry
*Assistant Examiner* — Harrison Heflin
(74) *Attorney, Agent, or Firm* — Maginot, Moore & Beck LLP

(57) ABSTRACT

A method for providing an assistance signal and/or a control signal for an at least partially automated vehicle includes receiving surroundings data, in particular an acoustic signal; recognizing a warning signal emitted by a further road user based on the received surroundings data; determining whether a hazardous situation relating to the vehicle is or was indicated by the warning signal; and providing the assistance signal and/or the control signal based on the result of the determination.

13 Claims, 1 Drawing Sheet

(56) References Cited

U.S. PATENT DOCUMENTS

2020/0089253 A1*  3/2020  Sudo .................... G05D 1/0255
2020/0160126 A1*  5/2020  Malach ................ G06K 9/6262

FOREIGN PATENT DOCUMENTS

| DE | 10 2014 215 900 A1 | 2/2016 |
| DE | 10 2014 015 493 A1 | 4/2016 |
| DE | 10 2015 224 463 A1 | 6/2017 |
| DE | 10 2016 002 230 A1 | 8/2017 |
| DE | 10 2016 209 552 A1 | 12/2017 |
| DE | 10 2016 213 300 A1 | 1/2018 |
| DE | 10 2016 226 309 A1 | 7/2018 |

* cited by examiner

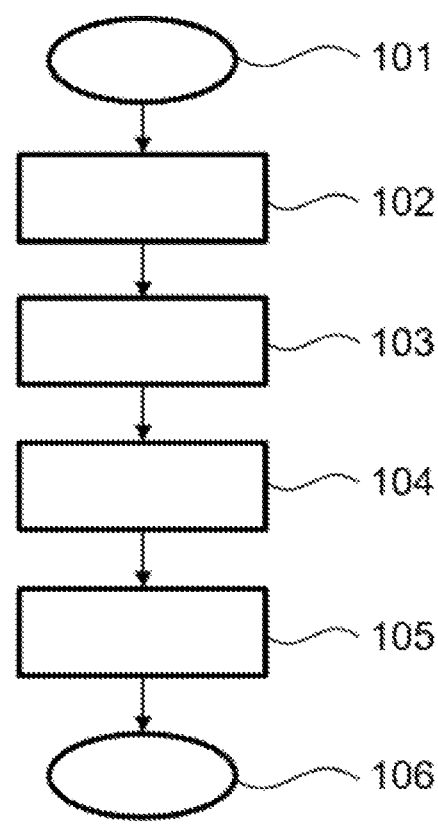

METHOD FOR PROVIDING AN ASSISTANCE SIGNAL AND/OR A CONTROL SIGNAL FOR AN AT LEAST PARTIALLY AUTOMATED VEHICLE

This application claims priority under 35 U.S.C. § 119 to patent application no. DE 10 2019 214 999.5, filed on Sep. 30, 2019 in Germany, the disclosure of which is incorporated herein by reference in its entirety.

The disclosure relates to a method for providing an assistance signal and/or a control signal for an at least partially automated vehicle, a device designed to execute the method, a computer program for executing the method, and a machine-readable storage medium, on which this computer program is stored.

BACKGROUND

A warning signal control system for motor vehicles having an optical warning signal actuator (headlight flasher L), and having an acoustic warning signal actuator (K) for emitting a vehicle-external warning noise differentiated from the typical horn signal is disclosed in DE 10 2014 215 900 A1.

SUMMARY

The disclosure describes a method for providing an assistance signal and/or a control signal for an at least partially automated vehicle and comprises the following steps:
  receiving surroundings data, in particular an acoustic signal;
  recognizing a warning signal emitted by a further road user based on the received surroundings data;
  determining whether a hazardous situation relating to the vehicle is or was indicated by the warning signal;
  providing the assistance signal and/or the control signal based on the result of the determination.

A hazardous situation relating to the vehicle can be understood in particular as a state of the vehicle, for example, a fire, an open door, an open tank lid, a flat or destroyed tire, a defective light, or leaking liquids, such as oil, brake fluid, or gasoline. In addition, a hazardous situation relating to the vehicle can be understood as an action of the vehicle which is planned or already carried out, for example, a lane change, or passing, stopping, braking, exiting, or turning maneuver. Planning of such an action can be performed, for example, on the basis of a light activation, for example, of a turn signal or a reversing light or brake light. Moreover, the planned action can be ascertained on the basis of a detected trajectory, for example, changing lanes for an exiting maneuver, a deceleration of a speed, an acceleration in the event of a planned passing maneuver, or the like.

A hazardous situation relating to the vehicle in particular cannot be understood as traffic situations resulting due to emergency vehicles. A detection of a special signal of an emergency vehicle, for example, a fire department vehicle, an ambulance, or a police car and a possibly required reaction thereto would therefore not be understood as a hazardous situation relating to the vehicle.

A vehicle operated at least partially automatically or a partially automated vehicle can be understood as a vehicle operated in a partially, highly, or fully automated manner. In particular, the automated vehicle can be a vehicle operated in a driverless manner, which can be operated at least partially without human intervention. The vehicle can be, for example, a classic passenger vehicle, a truck, a small bus, or a shuttle. The vehicle can furthermore also include other vehicle types, such as two-wheeled or three-wheeled vehicles.

The surroundings data can be, for example, data of the surroundings of the automated vehicle recorded by means of a sensor. The sensors can be, for example, sensors of a vehicle, such as video, radar, lidar, and/or ultrasonic sensors. The data can also be acoustic data of microphones. The sensors can also be attached to further vehicles and/or to infrastructure devices.

In addition, the surroundings data can also be already evaluated data from further road users and/or an external server. For example, a plurality of data received by a server can already have been aggregated and evaluated on this server.

The method can be carried out, for example, in a vehicle on one or more vehicle control units. Alternatively, the method can also be carried out externally to the vehicle on spatially separated servers or a control unit in an infrastructure device, such as a traffic signal.

The provision can take place in a wired or wireless manner. If the transmission takes place from a server or external unit to a vehicle, the transmission preferably takes place wirelessly, for example, via a mobile wireless network. If the method is executed in a vehicle and this vehicle is controlled, the transmission can also take place exclusively in a wired manner.

The assistance signal can be used in particular to represent the present situation for a further computer or a person, so as possibly to be able to enable or implement an improved reaction to the hazardous situation based on the reaction of the computer or person. Moreover, help can be provided based on the assistance signal, for example, an ambulance or the fire department can be informed.

In particular, based on the control signal, the vehicle can be controlled in such a way that the hazardous situation is mitigated. For example, by initiating a stopping maneuver, by terminating a planned maneuver, or by approaching a specific position, for example, a repair shop for remedying the circumstances causing the hazardous situation.

The provided method offers the advantage, inter alia, that recognizing hazardous situations is possible by way of warning indications of further road users. A reduction of the hazard potential thus results and accidents can be avoided.

In a further embodiment of the method, the surroundings data comprise an acoustic signal and the direction from which the acoustic signal was received is determined.

For this purpose, the vehicle can comprise in particular multiple microphones at different positions of the vehicle, so that the direction can be ascertained via a runtime determination on the basis of the microphones and their relative alignment.

In a further embodiment of the method, a distance to the source of the acoustic signal is moreover determined. For this purpose, in particular the amplitude of the signal can be evaluated. By classifying the signal, i.e., assigning the noise to a specific signal source, for example, expected amplitudes can be read out on the basis of a saved table and compared to the detected amplitude. Based thereon and on a model for the behavior of the amplitude as a function of the distance of the signal source from the microphone, the distance of the signal source can be concluded or at least an estimated value of the distance can be ascertained/output. It may be more easily ascertained in this way from where the warning signal originates.

In a further embodiment of the method, it comprises the additional step of ascertaining the road user which has output the warning signal.

An acoustic signal can be received in particular. The ascertainment can be carried out in particular based on the determination of the direction from which an acoustic signal was received or from which it originates and/or the distance of the signal source.

Alternatively or additionally, by means of supplementary sensors, for example, by means of a lidar, a camera, or a radar, the vehicle surroundings are sensed and following road users, in particular vehicles, are detected and/or classified.

With the aid of the items of directional information of the acoustic sensors and possibly a distance of the noise source from the vehicle ascertained based on the acoustic signal and the further object detection, a data fusion can be performed and the probability can be ascertained as to which of the following road users, in particular which vehicle, has emitted the acoustic signal.

In a further embodiment of the method, the surroundings data comprise sensor data of imaging sensors and the road user which has output the warning signal is ascertained based on the surroundings data of the imaging sensors.

For example, it can be ascertained by means of the imaging sensors whether one of the following vehicles has also activated a light signal (low beams, warning flashing light). This information can be supplemented with the above-described data fusion and the probability can be ascertained whether one of the road users which has possibly output the acoustic signal or warning signal has also simultaneously activated a light signal, or has activated and deactivated a corresponding light signal multiple times.

The step of determination can take place in particular in dependence on the road user or the direction from which the warning signal originates or at which distance to the vehicle the warning signal was emitted.

In a further embodiment of the method, in the step of determination it is ascertained whether damage to the vehicle itself and/or a state of the vehicle promoting a hazardous situation exists.

The probability of this can be described on the basis of an evaluation of a presently upcoming traffic situation and further vehicle sensors. Known methods for modeling and/or machine learning are suitable. For example, it can be ascertained whether the vehicle behaves conforming to the rules in accordance with the current traffic conditions (maintains applicable maximum speed, travels in the correct lane, no further vehicle is traveling ahead, no traffic junction is upcoming, . . . ). Moreover, it can be ascertained whether a defect has resulted on the vehicle (check error messages to light signals, items of tire pressure information, . . . further items of maintenance information). In addition, it can be ascertained how high the probability of an externally visible defect on the vehicle is. For example, imaging sensors which acquire a side of the vehicle can be used, for example, to detect an exhaust pipe which has fallen down and is dragging behind. In addition, smoke clouds acquired behind the vehicle can also indicate a defect on the vehicle.

In a further embodiment of the method, it is ascertained in the step of determination whether a hazard due to a driving maneuver of the vehicle which is carried out and/or planned represents or could represent a hazard to further road users.

The probability of this is ascertained in an expanded form via whether the vehicle has initiated or already started a change of a driving action in the chronological surroundings of the acoustic warning signal. This includes, for example, starting a lane change, traveling through traffic junctions, and the like. A further evaluation dimension results during the travel on the lane of the vehicle with respect to a significant change of the longitudinal speed.

Based on whether such actions were carried out chronologically before receiving the warning signal, a probability of a hazardous driving situation which could result or has resulted from the viewpoint of others due to a driving action of the vehicle which has been initiated or begun can be ascertained.

In a further embodiment of the method, the assistance signal is emitted to a teleoperator and the vehicle is operated based on a signal received from the teleoperator.

This embodiment of the disclosure offers the advantage that assistance is possible by way of a separated unit, whereby independent and possibly more reliable operation of the vehicle is possible. A teleoperator can be understood, for example, as an external processing unit which is designed to interpret the received data and to provide a signal for assisting the operation of the vehicle. The teleoperator can also be a person who provides a signal for improved operation of the vehicle based on the situations available to them.

In a further embodiment of the method, a driving action of the vehicle which is planned and/or has already begun is terminated based on the control signal.

This embodiment of the method offers the advantage that hazards due to this driving maneuver which is planned or has already begun can be remedied. The level of safety for the vehicle and the further road users is increased in this way.

The approach provided here furthermore provides a device which is designed to carry out, control, and/or implement the steps of a variant of a method provided here in corresponding devices. The underlying object of the disclosure can also be achieved rapidly and efficiently by this embodiment variant of the disclosure in the form of a device.

For this purpose, the device can have at least one processing unit for processing signals or data, at least one storage unit for storing signals or data, at least one interface to a sensor or an actuator for reading in sensor signals from the sensor or for outputting data or control signals to the actuator, and/or at least one communication interface for reading in or outputting data which are embedded in a communication protocol. The processing unit can be, for example, a signal processor, a microcontroller, or the like, wherein the storage unit can be a flash memory, an EEPROM, or a magnetic storage unit. The communication interface can be designed to read in or output data in a wireless and/or wired manner, wherein a communication interface which can read in or output data in a wired manner can read in these data electrically or optically from a corresponding data transmission line, for example, or output these data into a corresponding data transmission line.

A device can be understood in the present case as an electrical device which processes sensor signals and outputs control and/or data signals in dependence thereon. The device can have an interface, which can be designed in hardware and/or software. In a hardware design, the interfaces can be, for example, part of a so-called system ASIC, which includes greatly varying functions of the device. However, it is also possible that the interfaces are separate integrated circuits or at least partially consist of discrete components. In a software design, the interfaces can be software modules which are provided in addition to other software modules on a microcontroller, for example.

A computer program having program code which can be stored on a machine-readable carrier or storage medium such as a semiconductor memory, a hard drive memory, or an optical memory and is used to carry out, implement, and/or control the steps of the method according to one of the above-described embodiments, in particular when the program product or program is executed on a computer or a device, is also advantageous.

BRIEF DESCRIPTION OF THE DRAWING

The FIGURE shows a schematic method diagram.

DETAILED DESCRIPTION

According to the German Road Traffic Act, the horn can only be used as a warning instrument in hazardous situations. Against this background, it is useful for an at least partially automated vehicle to be able to perceive, interpret, and react to these items of information. In principle, such warning signals can be used by the following traffic for multiple reasons:

A first reason can be, for example, warning of the leading driver about a hazard directly relating to the leading driver (automobile smoking, tire is flat, lights are not working, planned lane change represents a hazard, vehicle is departing from the lane, . . . ).

A further reason can be, for example, that the following driver wishes to draw attention to themselves due to their own urgency, for example, to go forward faster (for example, emergency in the vehicle or a tailgater).

The present patent application primarily relates to the presence of the first mentioned reason, the presence of a hazardous situation relating to the vehicle itself.

In a first exemplary embodiment, a vehicle operated in a fully automated manner, i.e., a vehicle operated at least temporarily without an intervention of a driver, is equipped with multiple surroundings sensors, among them cameras, lidar sensors, radar sensors, ultrasonic sensors, and microphones. The vehicle is operated by a central control unit based on the data acquired by means of the surroundings sensors.

The method for providing an assistance signal and/or a control signal outlined in the FIGURE, which starts in step 101, runs in the vehicle.

In step 102, surroundings data are received by the vehicle, which comprise in particular camera data and acoustic signals.

In step 103, a warning signal emitted by a further road user is recognized based on the surroundings data. The acoustic signal is analyzed for this purpose and checked for the presence of acoustic warning signals, in particular signals generated by horns. An algorithm which has been trained to recognize horn signals by a machine learning method is used to recognize these horn signals.

In step 104, it is determined whether the warning signal indicates or indicated a hazardous situation relating to the vehicle. For this purpose, two things are checked in this exemplary embodiment.

On the one hand, it is determined whether a change of the vehicle control has occurred in a defined period before the acquisition of the warning signal, that is to say whether a change of the lateral or longitudinal acceleration or speed has occurred and/or whether a planned driving maneuver was initiated or is to be initiated. In this case, it is also checked whether a vehicle light or the like was already activated to initiate the maneuver.

If this check is positive, i.e., a change has occurred, it is ascertained based on an evaluation of the current traffic situation on the basis of the surroundings data whether a hazard exists to the vehicle and/or further road users due to the change.

Moreover, a vehicle diagnosis is carried out in which a review of possibly open doors, tank lids, damaged tires, the temperature, the brake pressure, and the like is carried out. The review comprises in particular a check of the functionality of the sensors, in particular the tire pressure sensors. Moreover, image data from the interior are evaluated to recognize fires or smoke development in the vehicle interior.

If it is determined in this case that a defect or a hazardous situation exists, the determination of whether a hazardous situation was indicated is positive. This also applies if it is determined that a hazard to the vehicle and/or further road users exists due to the change or planned change of the vehicle control.

In alternative embodiments, a check of only one of the points/things mentioned can also be carried out.

Based on the result of the determination, in step 105, the assistance signal and/or the control signal is provided.

If the determination is positive, a corresponding signal is thus output in dependence on the present hazardous situation. If it is determined that a hazard could arise due to a planned driving maneuver, a corresponding control signal is output to terminate the planned maneuver.

If it was determined that the vehicle control was changed or a change is planned and it cannot be ascertained whether a hazardous situation was indicated, the planned change is thus initially not carried out or already initiated changes are terminated, if they are not necessary to ensure the safety of the operation of the vehicle. A corresponding control signal is also provided for this purpose.

If it is determined, as in this exemplary embodiment, that smoke has developed in the vehicle interior, an assistance signal to a teleoperator is provided in order to examine the situation in greater detail. Moreover, based on the assistance signal, a message is output to any vehicle occupants present in the vehicle, in which the smoke development is indicated.

The method ends in step 106.

Further embodiments and designs of the method for providing an assistance signal and/or a control signal for an at least partially automated vehicle are described by way of example hereinafter.

In a vehicle operated in a partially automated manner, referred to as ego hereinafter, which is equipped with different surroundings sensors, among them cameras, lidar sensors, radar sensors, ultrasonic sensors, and microphones, the following method steps are carried out.

An acoustic warning signal output by a further vehicle is perceived by means of the microphones of the ego. Via the attachment of at least two microphones on the ego, a direction determination of the acoustic signal can be achieved via the correspondingly recorded signal characteristic. A probability can thus be ascertained with which the evaluated signal can be associated with the following traffic. A probability of a distance of the signal-triggering vehicle from the ego can also be ascertained via the signal strength and stored table values.

Furthermore, the surroundings of the ego are sensed and following vehicles are detected and classified by means of the supplementary sensors (lidar, video, radar).

With the aid of the distance and items of direction information of the acoustic sensors and the further object detection, a data fusion is performed and the probability is ascertained as to which of the following vehicles has triggered the acoustic signal.

In an alternative embodiment, it is ascertained using imaging sensors whether one of the following vehicles also activates a light signal (low beams, warning flashing light). These items of information are supplemented with the above-described sensor data fusion and a probability is ascertained that one of the objects, which has possibly activated an acoustic warning signal, has also simultaneously activated a light signal or has activated and deactivated it repeatedly or at high frequency.

If it should have been established with a certain probability in the case of a situation with a following vehicle that at least the directly following vehicle or the vehicle traveling directly in the parallel lane has triggered an acoustic warning signal, a probability with which the following vehicle wishes to notify the ego of a hazardous situation is furthermore ascertained.

Possible causes of an existing hazardous situation are divided into at least two cause categories for the ascertainment of such a probability:

a) ascertaining whether following traffic wishes to indicate a hazardous situation on the ego (flat tire, mechanical defect of another type, smoke development, open luggage compartment, . . . )

b) ascertaining whether following traffic wishes to indicate a hazardous situation which is triggered by the planned/current driving action of the ego (for example, commenced lane change provokes uncomfortable behavior in the follower, . . . )

The probability for a) can be described on the basis of the evaluation of the currently upcoming traffic situation and further vehicle sensors. Known methods for modeling and/or machine learning are suitable as methods. For example, the following steps can be carried out:

ascertaining that the ego behaves conforming to the rules in accordance with the current traffic conditions (maintains applicable maximum speed, travels in the correct lane, no further vehicle is traveling ahead, no traffic junction is upcoming, . . . )

furthermore ascertaining whether a defect has resulted on the vehicle (check error messages to light signals, items of tire pressure information, further items of maintenance information . . . )

ascertaining a probability about an externally visible defect on the vehicle.

The probability for b) is ascertained in an expanded form as to whether the ego has indicated or already started a change of a driving action in the chronological surroundings of the acoustic warning signal. This includes, for example, starting a lane change, traveling through traffic junctions, and the like.

A further evaluation dimension results while driving on the ego lane with respect to a significant change of the longitudinal speed.

In this case, a probability of a hazardous driving situation which could result from the viewpoint of others due to a driving action of the ego which has been initiated or begun is ascertained.

It is possible to react to a hazardous situation according to situation a) using the following measures:

A teleoperator is incorporated (by providing an assistance signal) to perform a possible visual check by way of sensor data.

A contact to a teleoperator and/or any passenger present is established (by providing an assistance signal), so that they can evaluate the situation.

The ego can be steered to a closest parking place, on the basis of a provided control signal. Any passenger present can carry out an external visual check there. Moreover, a maintenance team can be sent to the stopping point by the provision of an assistance signal.

The ego can be returned to the depot by a corresponding control signal.

It is possible to react to a hazardous situation according to situation b) using the following measures:

The ego ends the initiated or started driving action and returns to the original driving action.

The ego reacts in the original driving situation in accordance with the upcoming traffic situation.

What is claimed is:

1. A method for providing at least one of an assistance signal and a control signal for a vehicle that is at least partially automated, the method comprising:
   receiving surroundings data;
   recognizing a warning signal emitted by a warning signal actuator of a further road user based on the received surroundings data;
   determining whether a hazardous situation relating to the vehicle is or was indicated by the warning signal, the hazardous situation including at least one of (i) a hazardous state of the vehicle and (ii) a hazardous action of the vehicle that is planned or already carried out, the determining including:
      ascertaining whether damage to the vehicle is present that promotes the hazardous situation;
      ascertaining whether a state of the vehicle is present that promotes the hazardous situation; and
      ascertaining whether a driving maneuver of vehicle that is planned or already carried out promotes the hazardous situation; and
   providing the at least one of the assistance signal and the control signal based on whether the hazardous situation is or was indicated by the warning signal.

2. The method according to claim 1, wherein the surroundings data comprise an acoustic signal, and the method further comprises:
   determining a direction from which the acoustic signal was received.

3. The method according to claim 2, further comprising: determining a distance to a source of the acoustic signal.

4. The method according to claim 1, further comprising: ascertaining the further road user which has output the warning signal.

5. The method according to claim 1, wherein the surroundings data comprise sensor data of imaging sensors, and the method further comprises:
   ascertaining the further road user which has output the warning signal based on the sensor data of the imaging sensors.

6. The method according to claim 1, further comprising: emitting the assistance signal to a teleoperator; and operating the vehicle based on a signal received from the teleoperator.

7. The method according to claim 1, further comprising: terminating a driving action of the vehicle that is planned or already started, based on the control signal.

8. The method according to claim 1, wherein a device is configured to execute the method.

9. The method according to claim 1, wherein the signal actuator of the further road user is at least one of (i) an optical warning signal actuator and (ii) an acoustic warning signal actuator.

10. The method according to claim 9, wherein the warning signal is at least one of (i) a flashing light and (ii) a horn sound.

11. The method according to claim 1, wherein the hazardous state of the vehicle at least one of (i) a fire of the vehicle, (ii) an open door of the vehicle, (iii) an open tank lid of the vehicle, (iv) a flat tire of the vehicle, (v) a destroyed tire of the vehicle, (vi) a defective light of the vehicle, and (vii) liquids leaking from the vehicle.

12. The method according to claim 1, wherein the hazardous action of the vehicle includes at least one of (i) changing lanes, (ii) passing, (iii) stopping, (iv) braking, (v) exiting, (vi) turning, and (vii) accelerating.

13. A non-transitory machine-readable storage medium that stores a computer program for providing at least one of an assistance signal and a control signal for a vehicle that is at least partially automated, the computer program including commands that, when executed by a computer, cause the computer to:

receive surroundings data;

recognize a warning signal emitted by a warning signal actuator of a further road user based on the received surroundings data;

determine whether a hazardous situation relating to the vehicle is or was indicated by the warning signal, the hazardous situation including at least one of (i) a hazardous state of the vehicle and (ii) a hazardous action of the vehicle that is planned or already carried out, the determination including:

ascertaining whether damage to the vehicle is present that promotes the hazardous situation;

ascertaining whether a state of the vehicle is present that promotes the hazardous situation; and ascertaining whether a driving maneuver of vehicle that is planned or already carried out promotes the hazardous situation; and provide the at least one of the assistance signal and the control signal based on whether the hazardous situation is or was indicated by the warning signal.

\* \* \* \* \*